Inventor:
Peter Schmuck

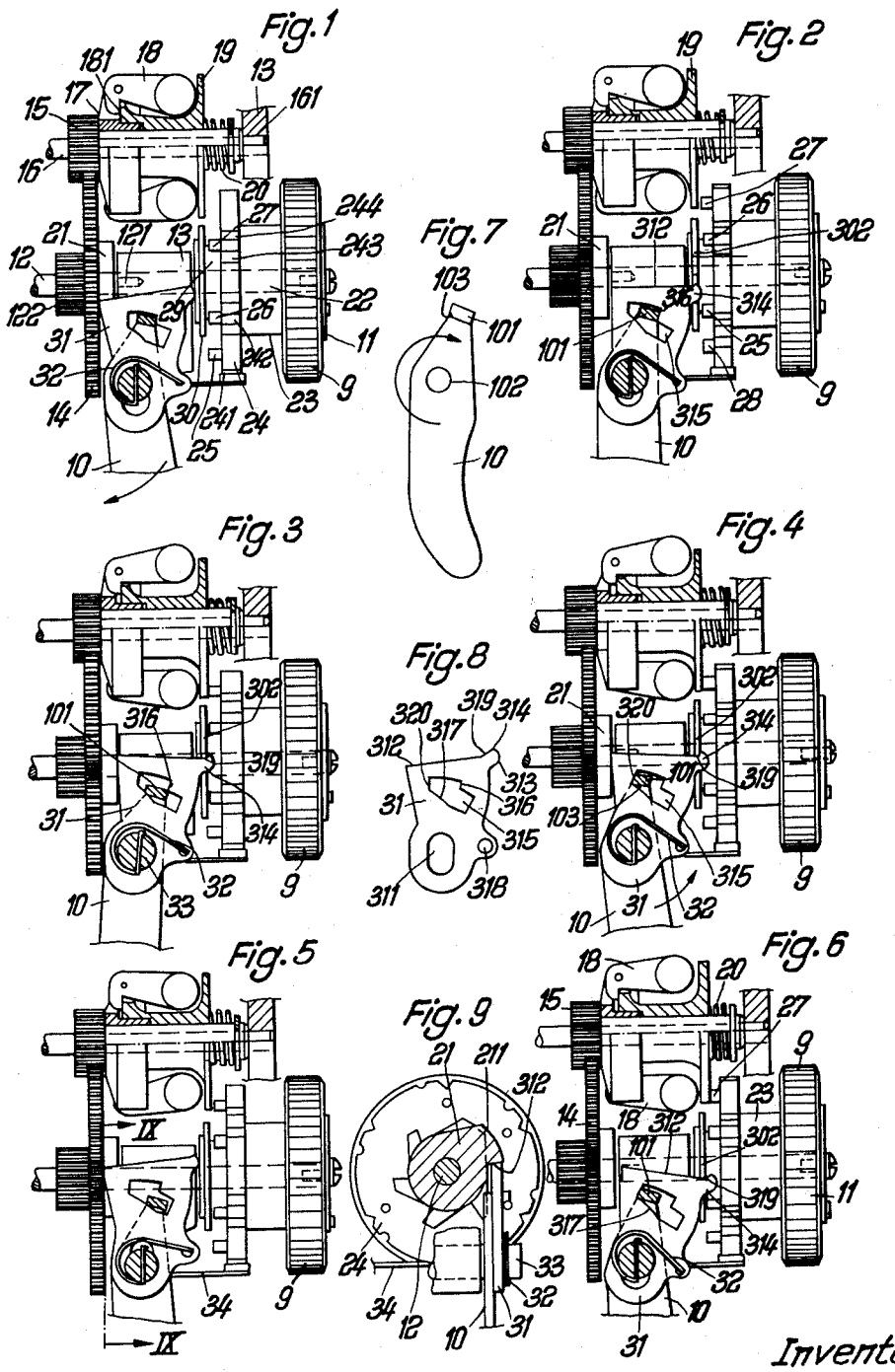

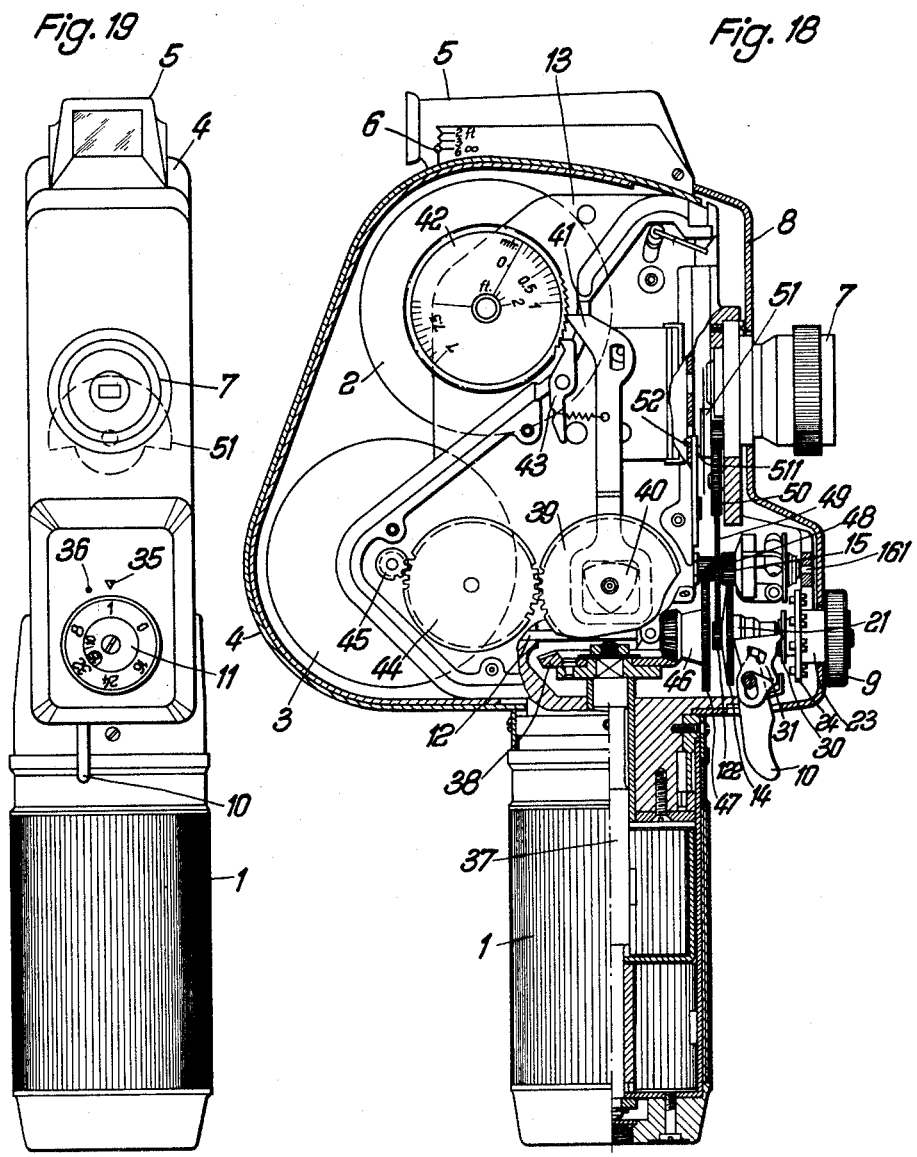

United States Patent Office 3,141,373
Patented July 21, 1964

3,141,373
MOTION PICTURE CAMERA CONTROL
MECHANISM
Peter Schmuck, 228 Ringstrasse, Mauren, Liechtenstein
Filed Feb. 12, 1959, Ser. No. 792,847
Claims priority, application Austria Feb. 18, 1958
16 Claims. (Cl. 88—17)

The increasing popularity of motion picture cameras for operation by amateurs, such as the miniature film cameras in the market, necessitates a greater simplification in the operation of such cameras than has thus far been achieved. Accordingly, the motion picture camera constructed according to the invention is characterized by the arrangement of a single setting element for a stop position, preferably designed a locked position, of the transmission for the film spool and shutter movements, for stills, automatic operation and various transmission speeds.

To satisfy the further requirements calling for a simple construction and, above all, a space-saving accommodation of the transmission, the present invention provides that the manually operable release member should not act directly on the transmission but rather that a latch member should be disposed between the release member for actuating the shutter and causing the winding of the film, on the one hand, and a control member controlled by the setting element, on the other hand, which latch member has a first stop face lying in the path of a locking cam revolving with the transmission when the setting element is in position for stills, and another stop face of this latch member is arranged to engage the locking lug of the control member before the first-mentioned stop face can be moved out of the path of the locking cam during movements of the release member in the locking position of the setting element. This enables the provision of a resilient support for the latch member so that the locking cam comes to rest under resilient spring action rather than suddenly when the release member is shifted to its stop or locking position. This protection of the transmission from shocks increases its life and provides an almost silent running of the transmission. As will be described more fully hereinafter, the same latch member enables the avoidance of intermediate positions of the release member shortly before the stop position, which intermediate positions causes a contact between parts connected to the release member and transmission parts still moving or revolving before the transmission comes to rest. Known structure operating this way provides unpleasant and disturbing transmission noises, the elimination of which is also an object of the present invention. The latch member enables also the release member to be held in a position for continuous operation without manual actuation by most simple means, only by an artificial obstruction to the movement of the control member, which obstruction can be achieved by a particularly close fit of the boundary surface of the control member and parts connected thereto. This arrangement provides automatic operation enabling the operator to photograph himself.

The drawing shows a motion picture camera constructed according to the invention in an illustrative embodiment, in which the drive mechanism is accommodated in an elongated handle of the camera. This drive mechanism may be of the spring or electric type because this handle is highly suitable for accommodating flashlight batteries and a small drive motor.

Specifically,

FIG. 1 of the drawing shows the structure of the invention in a stop position designed as a locked position.

FIG. 2 shows the parts in a position for continuous operation during the release thereof, whereas FIG. 3 shows a position of the transmission for continuous operation in a somewhat later phase of the release operation.

FIG. 4 shows a position of the transmission for continuous operation during the return movement of the release member to its initial position.

FIG. 5 shows the transmission during the taking of a still immediately after the termination of the operation, before the release member has returned to its position of rest.

FIG. 6 corresponds to the position of the parts during automatic operation.

FIG. 7 is a side elevation showing the release lever.

FIG. 8 is a similar view of the latch member.

FIG. 9 is a transverse sectional view taken through the lower part of the transmission along line IX—IX of FIG. 5.

Figure 10:
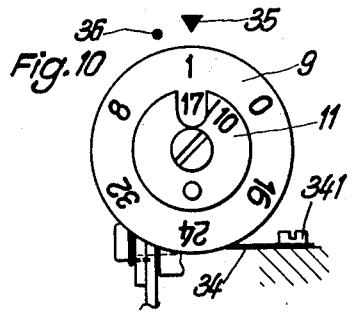

FIG. 10 is a front elevation view of a dial constructed as a setting element in the position thereof for the taking of stills.

Figure 11:
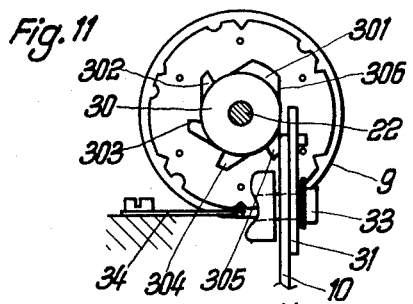

FIG. 11 is a rear view of the control member which is constructed as a disc and rotated by the setting disc in this position of the setting element.

Figure 12:
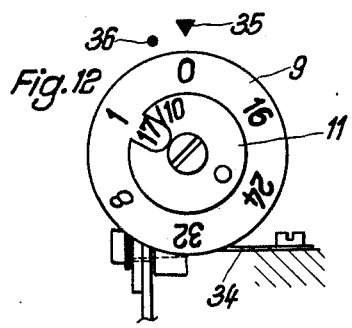

FIG. 12 shows the dial of FIG. 1 in the stop and locking position.

Figure 13:
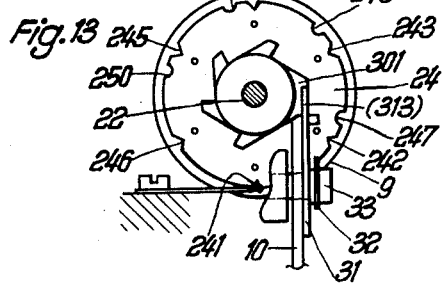

FIG. 13 shows the structure of FIG. 12 as seen from the rear.

Figure 14:
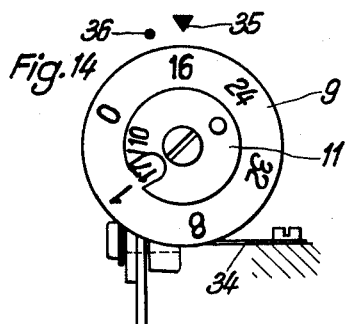

FIG. 14 shows the dial in one of the positions for continuous operation, namely the position for 16 frames per second.

Figure 15:
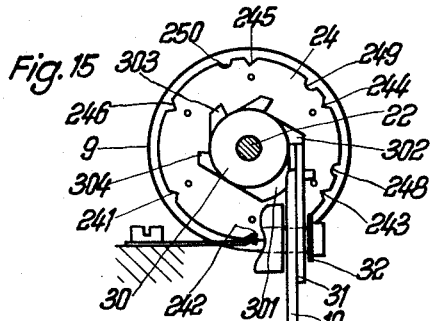

FIG. 15 is a rear view of the structure of FIG. 14.

Figure 16:
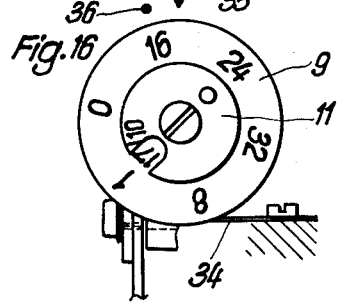

FIG. 16 illustrates the dial in the position for automatic operation at the speed of FIG. 14, in which position the transmission remains in operation after the release member has been actuated but without requiring further manual actuation of the release member.

Figure 17:
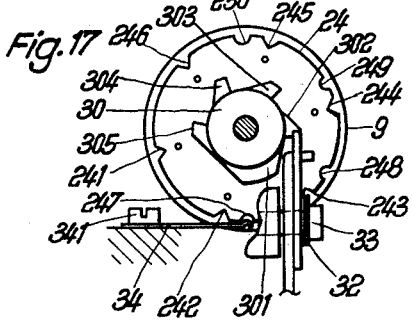

FIG. 17 is a rear view of the structure of FIG. 16.

FIG. 18 shows the entire camera mainly in longitudinal section, whereas

FIG. 19 is a front elevation of the camera of FIG. 18, showing the setting dial.

As is apparent from FIGS. 18 and 19 the motor and part of the drive mechanism of the camera are accommodated in the elongated handle 1, to which the camera body proper with the film spools 2, 3 is attached. A housing cap 4 carries the viewfinder 5 with the parallax compensator 6, the lens 7 and the gear housing 8 with the dial 9, release member 10 and film speed indicator 11. In the illustrated example the drive mechanism consists of a spring-driven mechanism. The bevel wheel 38 is driven by a spring 37 and is in mesh with the wheel 39, to which the cam 40 is fixedly connected, this cam 40 operating the footage counter wheel 42 by means of a pawl 41. The latch member 43 prevents a return movement of the footage counter 42. The toothed wheel 39 drives the film winding shaft 45 through the intermediary of the idler wheel 44. The bevel wheel 46 having the spur gear 47 affixed thereto is also in mesh with the bevel wheel 38. The wheel 47 is operatively connected to the driving wheel 48, which is rotatably mounted on the auxiliary gear shaft 16 to which the wheel 49 is firmly connected. The gear 49 drives by means of the idler wheel 50 the shutter 51 and by means of the crank 511 affixed to the shutter 51 the film feed mechanism 52. The idler wheel 49 transmits the spring force to the toothed wheel 122 mounted on the gear shaft 12. The shaft 12 is a plug shaft so that its removal and insertion involve no difficulty. As is shown in FIG. 1 the front end 121 of the gear shaft 12 is formed like a pin and the gear shaft 12 is mounted with this pinlike end in the body 13 of the camera. The toothed wheel 14 is non-rotatably connected to the toothed wheel 122 and in mesh with the toothed wheel 15 rotatably mounted on the auxiliary gear shaft 16, which is also formed as a plug shaft. Its extension 161 is mounted in the body 13 of the camera. The hub 17 for the weights 18 of the pendulum governor is non-rotatably connected to the toothed wheel 15. These weights act by means of an extension 181 on the governor brake disc 19, the necessary counterforce being exerted by a spring 20. Firmly connected to the toothed wheel 122 of the gear shaft 12 is the locking cam 21, the construction of which is apparent from FIG. 9. The stub shaft 22 is coaxial with the main gear shaft 12 and firmly connected to the body 13 and rotatably carries the setting element formed as a dial 9 with the film speed indicator disc 11. The dial 9 is connected by a shaft sleeve 23 to a setting disc 24, which carries brake pins 25, 26, 27 of different axial lengths for coaction with the brake disc 19 of the governor. Since these brake pins determine the axial position of the brake disc 19 and this axial position determines the prevailing speed of the transmission for continuous operation, the transmission may be set to different speeds by setting one or the other of pins 25, 26, 27 to register with the brake disc 19. By means of another part 29 of the shaft sleeve 23 the setting disc 24 is connected to a control member 30 which consists of a disc the shape of which is particularly clearly apparent from FIG. 11. A circular central portion of member 30 carries a radial locking lug 301, and radial holding lugs 302, 303, 304 and 305. A side face 306 of the control member 30 extends tangentially to the central portion of member 30.

According to the invention a latch member 31, the shape of which is apparent from FIG. 8, is disposed between the release member 10, for actuating the shutter and causing the winding of the film, and the member 30 which is controlled by means of the setting scale 9 and serves as a control member. This latch member has an elongated hole 311 for a yielding mounting of the same, a first stop face 312 which can be moved into and out of the path of the locking cam 21, another stop face 313, which in the locking position of the dial 9 engages the locking lug 301 of the member 30, a noselike stop 314, and a control slot 315 for receiving the actuating lug 101 of the release member 10. The control slot 315 has several side faces of predetermined configuration. Of these side faces, those numbered 316 and 317 are particularly important.

A bore 318 of the latch member 31 receives the end of the spring 32, the other end of which extends through a slot of the holding and carrying pin 33 for the latch member 31. As a result, the latch member 31 can perform an up and down control movement as well as a rotary movement about the pin 33.

In order to facilitate the shifting of the dial 9 with the parts 23, 24 and 30 to predetermined positions and the holding of the dial in these positions, the periphery of the setting disc 24 is provided with notches 241, 242, 243, 244, 245, 246 etc. A leaf spring 34 located at 341 in the camera housing has a nose-shaped bent portion adapted to engage the notches to provide a clicking device which performs the desired function. In addition to the notches 241, 242, 243, 244, 245 etc. corresponding to the positions of the dial 9 for continuous operation the setting disc 24 is provided at a small distance from these notches with additional notches 247, 248, 249, 250 etc. which correspond to the positions of the dial 9 for automatic operation as will be described hereinafter. To facilitate the setting of the dial 9 the main index mark 35 and the further index mark 36 are provided, which latter indicates to the automatic positions of the dial 9, as is apparent from FIG. 16.

The mode of operation of the mechanism described thus far is as follows:

FIGS. 1, 12 and 13 correspond to the stop position of the transmission, which position is designed as a locked position as has been mentioned several times hereinbefore. It is apparent from FIG. 1 that the stop face 312 lies in the path of the locking tooth 211 (see FIG. 9) of the locking cam 21. A rotation of the locking cam 21 and of the toothed wheels 14 and 122 firmly connected thereto is thus prevented and the transmission is arrested. In this position of the dial the release member 10 is locked against actuation by the engagement of the stop 313 of the latch 31 on the locking lug 301, as is particularly apparent from FIG. 13.

To shift the transmission from this stop and locked position to a position for continuous operation, the transmission assumes successively the positions of FIGS. 2, 3, 4 and 14, 15 if the setting is for continuous operation at a speed of 16 frames per second. The release member 10 has been released for actuation because the locking lug 301 lies no longer in the path of the stop face 313 of the latch member 31, as is apparent from FIG. 15. Thus the release member 10 can be swung about its bearing in the clockwise sense, which bearing is provided by the aperture 102 in the release member and the pin 33 extending through this aperture. During this clockwise rotation the actuating lug 101 of the release member 10 drives the latch member 31 by acting on the side face 316 of the control slot 315 so that the parts assume the position shown in FIG. 2. The dial 9 had previously been rotated to move the brake pin 27 to a position in which it is in registry with the brake disc 19 of the governor. The axial length of this brake pin 27 is exactly such that it compels the brake disc 19 of the governor to assume a position which corresponds to said transmission speed of 16 frames per second. This clockwise rotation of the latch member 31 has moved the stop face 312 thereof out of the path of the locking tooth 211 of the locking cam 21 so that the transmission is already rotating in this position of the parts. The release member 10 has already reached its end position but the latch member 31 performs now under the influence of the spring 32 a movement which is independent of the release member. As is shown in FIG. 3 the latch member 31 slides under the action of the spring 32 past the actuating lug 101 of the release member 10 and in doing so performs an upward movement. By this movement the nose 314 is moved with its locking face 319 behind the associated holding-back lug 302 (see FIG. 15) when viewed from the side of the gear shaft 12 so that the latch member 31 is locked during continuous operation in the position shown in FIG. 3 independently of the position of the release member 10.

This is important because it is an object of the invention to cause an instantaneous movement of the latch member into the path of the locking cam independently of the speed with which the release member 10 is moved to its initial position and without assuming intermediate positions in which there is no perfect locking action so that ratcheting of the transmission would occur.

FIG. 4 shows such an intermediate position of the release member during its return to its initial position. It is apparent that the now ensuing counterclockwise pivotal movement of the release member about its bearing 102, 33 has caused the actuating lug 101 to slide on the side face 317 of the control slot 315 so that the latch member 31 has been depressed against the action of the spring 32 from the raised position shown in FIG. 3. This has caused the withdrawal of the locking face 319 or nose 314 from the range of the holding lug 302 (see FIG. 15) and has released the latch member for a counterclockwise pivotal movement about the bearing 311, 33. At the time when this release occurs the spring 32 urges the latch member 31 so quickly in the counterclockwise sense back into the position for locking the transmission that any intermediate position of the latch member 31 before the complete locking of the locking cam 21 is precluded so that a repeated engagement of the locking tooth 211 on the stop face 312 of the latch member is prevented. During its next revolution the locking tooth 211 engages the stop face 312 of the latch member 31 for the first time unless the latch member 31 has reached the path of the locking tooth 211 of the locking cam 21 immediately after the depression of the latch member. If the elongated hole 311 is of sufficient length the latch member 31 having not yet reached its lowermost position can resiliently yield downwardly so that the transmission is locked gradually and resiliently without need for assuming any intermediate positions as would be required to avoid shocks on the transmission if the measures according to the invention had not been taken.

FIG. 5 shows in conjunction with FIGS. 10 and 11 the transmission parts in position for stills. A still results because the side face 306 of the control member 30 has been moved to the position of FIG. 11, which corresponds to the position of FIG. 10 so that neither the locking lug 301 nor the retaining lugs 302, 303 and 304 lie in the path of the stop face 319 of the nose 314 of the latch member 31. This means that the latch member moves from the position of FIG. 2 directly to the position of FIG. 5 because corresponding to the position of the parts shown in FIG. 1 neither the locking lug 301 nor the holding lug 302 visible in FIG. 3 nor any of the other holding lugs 303, 304 etc. lies in the path of the locking face 319 of the nose 314 of the latch member 31. Thus, the latch member 31 performs a counterclockwise pivotal movement about its bearing 311, 33 so that its stop face 312 is immediately restored into the path of the locking tooth 211 of the locking cam 21. As a result, the transmission performs a single revolution and the desired still is obtained.

FIG. 6 shows in conjunction with FIGS. 16 and 17 the dial 9 set to the mark 36 for continuous automatic operation at 16 frames per second. To enable this position to be assumed, the dial 9 is moved to a position in which the number 16 indicating continuous operation at 16 frames per second is in registry with mark 36 which indicates automatic operation at this speed. This causes the leaf spring 34 to spring into the notch 247 of the setting disc 24. The finding of the position in which the mark 36 is in registry with the number 16 is thus facilitated by the resilient clicking of the leaf spring 34 into the slot 247.

As is shown in FIG. 17 corresponding to this position the rotation of the dial 9 from the position of FIG. 14 into the position of FIG. 16 causes the holding lug 302 to be lowered from the position of FIG. 15. In spite of the fact that the release member 10 has already been swung back to its position of rest and does not contact the side face 317 with the side face 103 of its actuating lug 101 because the latch member 31 has already been lowered by the locking lug 302, the holding lug 302 is caused to lie in the path of the locking face 319 of the nose 314 of the latch member 31 so that the latter cannot perform a counterclockwise pivotal movement about the bearing 311, 33 in spite of the action of the spring 32. Even when no manual force is applied to the release member 10 to maintain this position the latch member cannot move to a position in which its stop face 312 would be in the path of the locking tooth 211 of the locking cam 21. For this reason the operator of the motion picture camera can leave the camera and photograph himself.

What has been said for the transmission speed of 16 frames per second applies obviously also to any other number of frames per second, i.e. for any continuous operation of the transmission because a separate holding lug 303, 304 etc. is provided for any transmission speed in addition to the holding lug 302 for the transmission speed of 16 frames per second.

It is not essential, of course, to provide special notches 247, 248, 249, 250 for the automatic operation. It would be sufficient to provide a friction fit between the stub shaft 22 and the rotatable parts 9, 23, 24, 29, 30 so that the friction between the fixed and moved parts is sufficient to retain the parts in the positions in which the numbers indicating the various speeds are in registry with the mark 36.

What is claimed is:

1. In a motion picture camera, in combination, support means; manually operable latch means having a rest position preventing the camera from operating, said latch means being supported by said support means for movement by the operator from said rest position to a release position releasing the camera for operation; manually operable setting means carried by said support means for movement between a manual-operation position where said setting means cooperates with said latch means to permit return of the latter to its rest position at the will of the operator and an automatic-operation position where said setting means cooperates with said latch means to prevent return thereof to said rest position; and manually operable release means carried by said support means for movement by the operator and cooperating with said latch means for moving the same from said rest position to said release position, said manually operable release means maintaining said latch means in said release position thereof as long as the operator actuates said release means when said manually operable setting means is in said manual-operation position thereof, and said latch means being maintained in said release position thereof irrespective of the manner in which the operator actuates said release means when said manually operable setting means is in said automatic-operation position thereof.

2. In a motion picture camera, in combination, support means; manually operable latch means carried by said support means for movement between a rest position where said latch means prevents operation of the camera and a release position where said latch means releases the camera for operation; manually operable setting means carried by said support means for movement between a manual-operation position where said setting means cooperates with said latch means to permit return of the latter to said rest position thereof at the will of the operator and a single-exposure position where said setting means cooperates with said latch means to free the latter for return to its rest position after a single exposure is made; and manually operable release means carried by said support means for movement by the operator and cooperating with said latch means for moving the same from said rest position to said release position thereof, said latch means remaining in said release position thereof as long as the operator actuates said manually operable release means when said manually operable setting means is in said manual-operation position thereof, and said latch means returning to said rest position thereof after a single exposure irrespective of the manner in which the operator actuates said manually operable release means when said manually operable setting means is in said single-exposure position thereof.

3. In a motion picture camera, in combination, support means; latch means carried by said support means for movement between a rest position where said latch means prevents operation of the camera and a release position where said latch means releases the camera for operation; manually operable release means carried by said support means for movement by the operator and cooperating with said latch means for moving the same from said rest to said release position thereof; and manually operable setting means carried by said support means for movement between a manual-operation position where said setting means cooperates with said latch means to free the latter for return to its rest position when the operator releases said release means, an automatic-operation position where said setting means cooperates with said latch means to prevent return of the latter to its rest position irrespective of the manual operation of release means, and a single-exposure position where said setting means frees said latch means for return to its rest position after a single exposure also irrespective of the manual operation of said release means.

4. In a motion picture camera, in combination, support means; manually operable release means movably carried by said support means for movement by the operator between a stop position where the camera is stopped and a start position where the camera starts operating; latch means carried by said support means for movement between a rest position where said latch means prevents operation of the camera and a release position where said latch means releases the camera for operation, said manually operable release means when moving from its stop to its start position moving said latch means from its rest to its release position; spring means cooperating with said latch means and release means for automatically returning said latch means from its release to its rest position as soon as said release means has reached said starting position thereof so that the camera will make a single exposure and then stop operating; and manually operable setting means carried by said support means for movement between a single-exposure position where said setting means is out of the path of movement of said latch means so that the latter will immediately be returned by said spring means to its rest position for making only a single exposure, a manual-operation position where said setting means cooperates with said latch means to retain the latter in its release position only as long as the operator holds said release means in said starting position thereof, and an automatic-operation position where said setting means cooperates with said latch means to retain the latter in its release position irrespective of the operation of said release means by the operator.

5. In a motion picture camera, in combination, support means; manually operable release means movably carried by said support means for movement by the operator between a stop position where the camera is stopped and a start position where the camera starts operating; latch means carried by said support means for movement between a rest position where said latch means prevents operation of the camera and a release position where said latch means releases the camera for operation, said manually operable release means when moving from its stop to its start position moving said latch means from its rest to its release position; spring means cooperating with said latch means and release means for automatically returning said latch means from its release to its rest position as soon as said release means has reached said starting position thereof so that the camera will make a single exposure and then stop operating; and manually operable setting means carried by said support means for movement between a single-exposure position where said setting means is out of the path of movement of said latch means so that the latter will immediately be returned by said spring means to its rest position for making only a single exposure, a manual-operation position where said setting means cooperates with said latch means to retain the latter in its release position only as long as the operator holds said release means in said starting position thereof, and an automatic-operation position where said setting means cooperates with said latch means to retain the latter in its release position irrespective of the operation of said release means by the operator, and said manually operable setting means having also a lock position located in the path of movement of said latch means from said rest to said release position thereof to prevent movement of said latch means by said release means from said rest to said release position so as to lock the camera against operation.

6. In a motion picture camera, in combination, support means; drive means carried by said support means for driving the camera; governor means cooperating with said drive means to control the speed of operation of the camera; manually operable release means carried by said support means for movement between a stop position where the camera is stopped and a start position where the camera starts to operate; latch means movably carried by said support means for movement between a rest position where said latch means cooperates with said drive means to prevent operation of the latter and a release position where said latch means releases said drive means for operation of the camera, said release means cooperating with said latch means to move the latter from said rest to said release position thereof when said release means is moved by the operator from said stop to said start position thereof; and manually operable setting means having a plurality of manual-operation positions where said setting means respectively cooperates with said governor means to control the latter for operating the camera at one of a plurality of selected speeds of operation according to the particular manual-operation position in which said setting means is placed by the operator, said setting means cooperating in each of its manual-operation positions with said latch means to retain the latter in its release position until the operator releases said release means for movement from its start back to its stop position, and said manually operable setting means also having a plurality of automatic-operation positions respectively corresponding to said plurality of manual-operation positions and respectively cooperating with said governor means to provide the same plurality of selected speeds as said setting means in said plurality of manual-operation positions thereof, said setting means cooperating in each of its automatic-operation positions with said latch means to retain the latter in its release position even when said release means is released by the operator for movement from its start back to its stop position.

7. In a motion picture camera, in combination, support means; a single manually operable setting means carried by said support means for setting the camera to operate manually at any one of a plurality of different speeds of operation, automatically at any one of a plurality of different speeds of operation, to make single exposures, and to lock the camera against operation; and manually operable means carried by said support means and cooperating with said setting means for starting the operation of the camera according to the particular setting of said setting means, said manually operable means being operated in the same way by the operator irrespective of the setting of said setting means.

8. In a motion picture camera, in combination, support means; drive means carried by said support means for driving the camera, said drive means including a rotary member having a projection; latch means carried by said support means for movement between a rest position where said latch means is engaged by said projection of said rotary member to prevent operation of said drive means and a release position where said latch means is located beyond said projection to release the camera for operation; manually operable release means carried by said support means for movement by the operator between a stop position where the camera is stopped and a start position where the camera starts to operate, said release being in its stop position when said latch means is in said rest position thereof, and said release means cooperating with said latch means to move the latter from said rest to said release position thereof when said release means is moved by the operator from said stop to said start position thereof; spring means cooperating with said latch means to urge the latter back to said rest position thereof as soon as said latch means reaches said release position thereof, said spring means also cooperating with said latch means to cushion the engagement of said projection with said latch means so that there is no undesirable shock; and manually operable setting means carried by said support means for movement between a single-exposure position where said setting means is out of the path of movement of said latch means so that the latter is immediately returned to its rest position by said spring means as soon as said latch means reaches said release position thereof, a manual-operation position where said setting means cooperates with said latch means to retain the latter in its release position only as long as the operator retains said release means in said starting position thereof, and an automatic-operation position where said setting means cooperates with said latch means to retain the same in said release position thereof even if the operator releases said release means.

9. In a motion picture camera, in combination, drive means including a rotary member having a projection; a stationary pin; a latch member formed with an elongated opening through which said stationary pin passes so that said latch member is supported by said pin for rotary movement with respect to said pin as well as for shifting movement longitudinally of said opening with respect to said pin, said latch member also being formed with a second opening part of which is defined by a shoulder of said latch member; a release member turnably carried by said pin and having an operating lug extending into said second opening of said latch member and engaging said shoulder thereof when said release member is in a stop position thereof and said latch member is in a rest position thereof, said projection of said rotary member engaging said latch member when the latter is in said rest position thereof so that said latch member prevents operation of said drive means when said latch member is in said rest position thereof, said release member when manually turned around said pin acting through its lug on said shoulder of said latch member to move the latter from said rest position thereof to a release position where said latch member is located beyond said projection of said rotary member so as to release the camera for operation; and spring means cooperating with said latch member for shifting the same longitudinally of said first-mentioned opening thereof along said pin in a direction which displaces said shoulder from said lug as soon as said latch member has reached said release position thereof, said spring means also urging said latch member after displacement of said shoulder beyond said lug back to said rest position thereof so that unless some outside force acts on said latch member the latter will be immediately returned to its rest position where said projection of said rotary member will engage said latch member to stop the operation of the camera and thus the camera will make only a single exposure.

10. In a motion picture camera, in combination, drive means including a rotary member having a projection; a stationary pin; a latch member formed with an elongated opening through which said stationary pin passes so that said latch member is supported by said pin for rotary movement with respect to said pin as well as for shifting movement longitudinally of said opening with respect to said pin, said latch member also being formed with a second opening part of which is defined by a shoulder of said latch member; a release member turnably carried by said pin and having an operating lug extending into said second opening of said latch member and engaging said shoulder thereof when said release member is in a stop position thereof and said latch member is in a rest position thereof, said projection of said rotary member engaging said latch member when the latter is in said rest position thereof so that said latch member prevents operation of said drive means when said latch member is in said rest position thereof, said release member when manually turned around said pin acting through its lug on said shoulder of said latch member to move the latter from said rest position thereof to a release position where said latch member is located beyond said projection of said rotary member so as to release the camera for operation; spring means cooperating with said latch member for shifting the same longitudinally of said first-mentioned opening thereof along said pin in a direction which displaces said shoulder from said lug as soon as said latch member has reached said release position thereof, said spring means also urging said latch member after displacement of said shoulder beyond said lug back to said rest position thereof so that unless some outside force acts on said latch member the latter will be immediately returned to its rest position where said projection of said rotary member will engage said latch member to stop the operation of the camera and thus the camera will make only a single exposure; and manually operable rotary setting means turnable by the operator to a selected angular position where a selected type of operation of the camera will be produced, said setting means having a single-exposure position where it is located entirely out of the path of movement of said latch member so that the latter will be immediately turned by said spring means to said rest position in order to make a single exposure.

11. In a motion picture camera, in combination, drive means including a rotary member having a projection; a stationary pin; a latch member formed with an elongated opening through which said stationary pin passes so that said latch member is supported by said pin for rotary movement with respect to said pin as well as for shifting movement longitudinally of said opening with respect to said pin, said latch member also being formed with a second opening part of which is defined by a shoulder of said latch member; a release member turnably carried by said pin and having an operating lug extending into said second opening of said latch member and engaging said shoulder thereof when said release member is in a stop position thereof and said latch member is in a rest position thereof, said projection of said rotary member engaging said latch member when the latter is in said rest position thereof so that said latch member prevents operation of said drive means when said latch member is in said rest position thereof, said release member when manually turned around said pin acting through its lug on said shoulder of said latch member to move the latter from said rest position thereof to a release position where said latch member is located beyond said projection of said rotary member so as to release the camera for operation; spring means cooperating with said latch member for shifting the same longitudinally of said first-mentioned opening thereof along said pin in a direction which displaces said shoulder from said lug as soon as said latch member has reached said release position thereof, said spring means also urging said latch member after displacement of said shoulder beyond said lug back to said rest position thereof so that unless some outside force acts on said latch member the latter will be immediately returned to its rest position where said projection of said rotary member will engage said latch member to stop the operation of the camera and thus the camera will make only a single exposure; and rotary, manually operable setting means selectively turnable by the operator to a selected angular position for providing a desired type of operation, said setting means including a rotary control member which has at least one projection past which a portion of said latch member moves when said latch member reaches said release position thereof, said latch member having a projecting portion which becomes located behind said projection of said control member when said latch member is moved by said spring means in the direction which displaces said shoulder from said lug, so that said control member of said setting means will retain said latch member in said release position thereof, said second opening of said latch member having an inclined edge portion engaged by said lug during return of said release member from its starting to its stop position for moving said latch member in opposition to said spring means in a direction which displaces said projecting portion of said latch member from said projection of said control member so that said spring means can then return said latch member to its rest position for stopping the operation of the camera.

12. In a motion picture camera, in combination, drive means including a rotary member having a projection; a stationary pin; a latch member formed with an elongated opening through which said stationary pin passes so that said latch member is supported by said pin for rotary movement with respect to said pin as well as for shifting movement longitudinally of said opening with respect to said pin, said latch member also being formed with a second opening part of which is defined by a shoulder of said latch member; a release member turnably carried by said pin and having an operating lug extending into said second opening of said latch member and engaging said shoulder thereof when said release member is in a stop position thereof and said latch member is in a rest position thereof, said projection of said rotary member engaging said latch member when the latter is in said rest position thereof so that said latch member prevents operation of said drive means when said latch member is in said rest position thereof, said release member when manually turned around said pin acting through its lug on said shoulder of said latch member to move the latter from said rest position thereof to a release position where said latch member is located beyond said projection of said rotary member so as to release the camera for operation; spring means cooperating with said latch member for shifting the same longitudinally of said first-mentioned opening thereof along said pin in a direction which displaces said shoulder from said lug as soon as said latch member has reached said release position thereof, said spring means also urging said latch member after displacement of said shoulder beyond said lug back to said rest position thereof so that unless some outside force acts on said latch member the latter will be immediately returned to its rest position where said projection of said rotary member will engage said latch member to stop the operation of the camera and thus the camera will make only a single exposure; and manually operable rotary setting means turnable by the operator to a selected angular position where a selected type of operation of the camera will be produced, said setting means having a single exposure position where it is located entirely out of the path of movement of said latch member so that the latter will be immediately turned by said spring means to said rest position in order to make a single exposure, said setting means including a rotary control member which has at least one projection past which a portion of said latch member moves when said latch member reaches said release position thereof, said latch member having a projecting portion which becomes located behind said projection of said control member when said latch member is moved by said spring means in the direction which displaces said shoulder from said lug, so that said control member of said setting means will retain said latch member in said release position thereof, said second opening of said latch member having an inclined edge portion engaged by said lug during return of said release member from its starting to its stop position for moving said latch member in opposition to said spring means in a direction which displaces said projecting portion of said latch member from said projection of said control member so that said spring means can then return said latch member to its rest position for stopping the operation of the camera, and said setting means being turnable slightly beyond said angular position where said projection of said control member cooperates with said projecting portion of said latch member to a position where said projection of said control member still cooperates with said projecting portion to retain said latch member in said release position thereof even after said lug cooperates with said inclined edge of said second opening so as to set the camera for automatic operation without intervention of the operator.

13. In a motion picture camera, in combination, support means; control means supported for rotary movement by said support means to one of a plurality of angular positions where said control means will cooperate with other parts of the camera to provide a desired type of operation; speed-regulating means coaxial with said control means and connected thereto for rotary movement therewith to a selected angular position, said speed-regulating means cooperating with a governor of the camera in the different angular positions of said speed-regulating means to provide a selected speed of operation of the camera; and manually engageable means connected with said speed-regulating means and said control means for simultaneously turning the latter about the axis to a selected angular position where a selected type of operation will be provided by said control means and where a selected speed of operation will be provided by said speed-regulating means.

14. In a motion picture camera, in combination, support means; a single manually operable setting means carried by said support means for setting the camera for continuous operation at any one of a plurality of different speeds of operation and for alternatively setting the camera for discontinuous operation to make single exposures; and actuating means carried by said support means and manually operable independently of said setting means, said manually operable actuating means co-operating with said setting means and being actuated by the operator in exactly the same way irrespective of the type of operation selected with said setting means.

15. In a motion picture camera, in combination, support means; a single manually operable setting means carried by said support means for setting the camera for manual operation manually at any one of a plurality of different speeds of operation and for alternatively setting the camera for automatic operation at any one of a plurality of different speeds of operation; and actuating means carried by said support means and manually operable independently of said setting means, said manually operable actuating means co-operating with said setting means and being actuated by the operator in exactly the same way irrespective of the type of operation selected with said setting means.

16. In a motion picture camera, in combination, support means; a single manually operable setting means carried by said support means for setting the camera for manual continuous operation at any one of a plurality of different speeds of operation for alternatively setting the camera for automatic continuous operation at any one of a plurality of different speeds of operation, and for alternatively setting the camera for discontinuous operation to make single exposures; and actuating means carried by said support means and manually operable independently of said setting means, said manually operable actuating means cooperating with said setting means and being actuated by the operator in exactly the same way irrespective of the type of operation selected with said setting means.

References Cited in the file of this patent

UNITED STATES PATENTS

| | | |
|---|---|---|
| 1,295,081 | Tartara | Feb. 18, 1919 |
| 2,105,631 | Becker | Jan. 18, 1938 |
| 2,226,188 | Wittel | Dec. 24, 1940 |
| 2,323,576 | Sperry | July 6, 1943 |
| 2,493,443 | Cisski | Jan. 3, 1950 |
| 2,986,067 | Gopfert et al. | May 30, 1961 |

FOREIGN PATENTS

| | | |
|---|---|---|
| 388,098 | Great Britain | Feb. 23, 1933 |